United States Patent
Liu et al.

(10) Patent No.: US 10,064,166 B1
(45) Date of Patent: Aug. 28, 2018

(54) MANAGEMENT OF CHANNEL STATE INFORMATION REPORTING RATE IN A COMMUNICATIONS SYSTEM

(71) Applicant: Sprint Spectrum L.P., Overland Park, KS (US)

(72) Inventors: Chunmei Liu, Great Falls, VA (US); Pratik Kothari, Sterling, VA (US); Hemanth B. Pawar, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 310 days.

(21) Appl. No.: 14/881,724

(22) Filed: Oct. 13, 2015

(51) Int. Cl.
*H04W 72/04* (2009.01)
*H04W 24/10* (2009.01)
*H04L 5/00* (2006.01)
*H04W 76/04* (2009.01)
*H04W 28/02* (2009.01)
(Continued)

(52) U.S. Cl.
CPC ....... *H04W 72/0413* (2013.01); *H04L 5/0057* (2013.01); *H04W 24/10* (2013.01); *H04W 28/0205* (2013.01); *H04W 72/0453* (2013.01); *H04W 76/046* (2013.01); *H04W 76/27* (2018.02); *H04W 88/02* (2013.01); *H04W 88/08* (2013.01); *H04W 92/10* (2013.01)

(58) Field of Classification Search
None
See application file for complete search history.

(56) References Cited

U.S. PATENT DOCUMENTS 9,025,463 B1    5/2015    Mankee et al.
9,137,001 B2    9/2015    Shah et al.
(Continued)

FOREIGN PATENT DOCUMENTS

WO    WO 2010/019080 A1    2/2010
WO    WO 2011/002389 A1    1/2011
WO    WO 2011/099906 A1    8/2011

OTHER PUBLICATIONS

Co-Pending U.S. Appl. No. 14/828,298, filed Aug. 17, 2015, "Method and System for Managing Congestion in Inter-Band Carrier Aggregation".
(Continued)

*Primary Examiner* — Edan Orgad
*Assistant Examiner* — Saumit Shah

(57) ABSTRACT

According to aspects of the disclosure, a method and system are provided for managing signaling in a wireless communication network. In accordance with the disclosure, a base station serves a plurality of user equipment devices (UEs) via an air interface extending between the base station and the UEs. The base station also receives, on an uplink of the air interface, a report from each UE indicating channel state information (CSI). The base station periodically receives the report from each UE according to a CSI reporting rate specified by the base station for the UE. The base station may determine that a level of loading on the uplink is greater than a threshold load value. Responsive to such determination, the base station selects a subset of the plurality of UEs and reduces the CSI reporting rate for the selected subset of the plurality of UEs to reduce congestion on the uplink.

20 Claims, 5 Drawing Sheets

(51) Int. Cl.
*H04W 76/27* (2018.01)
*H04W 88/08* (2009.01)
*H04W 92/10* (2009.01)
*H04W 88/02* (2009.01)

(56) References Cited

U.S. PATENT DOCUMENTS

| | | | | |
|---|---|---|---|---|
| 2011/0077020 A1* | 3/2011 | Zangi | ............... | H04L 1/0026 455/453 |
| 2012/0039252 A1* | 2/2012 | Damnjanovic | ....... | H04L 1/0026 370/328 |
| 2012/0057499 A1* | 3/2012 | Pedersen | ............... | H04L 1/0029 370/252 |
| 2012/0092989 A1* | 4/2012 | Baldemair | ............ | H04W 24/10 370/230 |
| 2012/0196607 A1* | 8/2012 | Samardzija | .......... | H04J 11/0053 455/450 |
| 2013/0279343 A1* | 10/2013 | Jeong | ................... | H04W 24/10 370/241 |
| 2013/0308483 A1* | 11/2013 | Jalloul | ................. | H04W 48/18 370/252 |
| 2014/0011531 A1* | 1/2014 | Burstrom | ............ | H04W 72/121 455/509 |
| 2015/0141027 A1 | 5/2015 | Tsui et al. | | |

OTHER PUBLICATIONS

Co-Pending U.S. Appl. No. 14/739,741, filed Jun. 15, 2015, "Management of Handover in a Communications System".
Co-Pending U.S. Appl. No. 14/632,334, filed Feb. 26, 2015, "Management of TTI Bundling for Carrier Aggregated Communications".

* cited by examiner

MANAGEMENT OF CHANNEL STATE INFORMATION REPORTING RATE IN A COMMUNICATIONS SYSTEM

BACKGROUND

Unless otherwise indicated herein, the description provided in this section is not itself prior art to the claims and is not admitted to be prior art by inclusion in this section.

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide, and the base station may then schedule particular downlink and uplink resource blocks on that carrier to carry data communications to and from the UE.

Under certain air interface protocols, a base station may be able to serve a UE concurrently on multiple carriers, to help increase the effective bandwidth and associated throughput available to the UE. This is known as carrier aggregation. By way of example, according to the LTE air interface protocol, the maximum bandwidth for a data transaction between a base station and a UE using a single carrier frequency is 20 MHz. By engaging in carrier aggregation, the base station may increase the number of resource blocks provided to a UE by aggregating up to five carrier frequencies, and consequently increasing the maximum bandwidth to up to 100 MHz. To facilitate carrier aggregation service, the base station may designate one carrier as a primary carrier or primary cell (PCell) and the base station may designate each other carrier as a secondary carrier or secondary cell (SCell). Further, each aggregated carrier may be generally referred to as a component carrier.

While a base station serves a UE on a single carrier or on multiple carriers, the base station and UE may modulate their air interface data communications at a coding rate selected based on the UE's channel quality, such as with higher coding rate when the UE has better channel quality and with a lower coding rate when the UE has worse channel quality. Further, while the base station serves the UE, the UE's channel quality may change for a variety of reasons such as, for example, due to channel fading or multipath. To determine the channel quality for a UE, the base station may employ a channel state feedback reporting procedure. For instance, in an LTE system, the UE periodically reports to the base station channel state information (CSI), which includes, among other things, a channel quality indicator (CQI) that takes into account factors such as signal-to-noise ratio, antenna configuration, UE receiver type, and so forth. The UE determines the CSI based, at least in part, on downlink transmissions and the UE reports the CSI to the base station using uplink channels at regular intervals specified by the base station (i.e., according to a specified "CSI reporting rate"). The base station may then determine from the reported CSI a particular modulation and coding scheme (MCS) to use for communication with the UE, and the base station may allocate air interface resources and schedule transmissions of data accordingly. It is thus beneficial for the base station to have accurate and up-to-date information of the prevailing channel quality for a UE so that the base station can make appropriate decisions as to resource allocation and MCS.

OVERVIEW

In a typical wireless communication system, the base station may specify a relatively high CSI reporting rate to served UEs to ensure that it has accurate and up-to-date channel quality information for all UEs in its coverage. Unfortunately, however, this reporting arrangement can give rise to a problem because the higher the CSI reporting rate, the more significant the uplink signaling overhead becomes for reporting CSI. In practice, a base station may have only a limited extent of uplink resources available to serve UEs (e.g., due to the operator of a wireless communication system having only a limited number of licensed carriers in a given market). Thus, in some scenarios, depending on the number of UEs served by the base station and the specified CSI reporting rate for those UEs, the uplink may become congested.

As one example, uplink congestion may occur in some scenarios in which a base station serves UEs with carrier aggregation. For instance, consider an example carrier aggregation scenario in which the SCell(s) may be used principally for downlink communication (to increase the UEs' downlink throughput) rather than for uplink communication, and the PCell may carry some or all control signaling related to the SCell(s) (in addition to control signaling related to the PCell). Further, consider that each UE may transmit a separate CSI report to the base station for each component carrier it is served on. As a result, the uplink for the PCell may become congested due to the UEs reporting CSI for multiple carriers over the uplink of a single carrier (i.e., due to UEs reporting CSI for PCell and SCell(s) over the uplink of the PCell). Other examples in which a base station may experience uplink congestion are also possible.

Generally, when an uplink becomes congested, service may be degraded (e.g., due to latency in allocating uplink resources) and/or the number of UEs served by a base station may be limited. Consequently, it would be desirable to reduce and/or avoid congestion of an uplink. Disclosed herein is a method and system for managing signaling in a wireless communication network to help to reduce and/or avoid congestion of an uplink. In particular, the disclosure provides for determining when a load on the uplink exceeds a threshold load value, and then, responsive to such determination, selecting a subset of one or more UEs served by the base station and reducing the CSI reporting rate for the selected subset of UE(s). By reducing the CSI reporting rate for the subset of UE(s), fewer CSI reports may be transmitted to the base station over a given period of time, thereby reducing uplink signaling overhead. Accordingly, the present disclosure provides for systems and methods that can dynamically adjust the CSI reporting rates for select UEs in an effort to reduce uplink congestion.

According to aspects of the disclosure, the systems and methods can select the subset of UE(s) based on one or more conditions that may inform whether and to what extent the CSI reporting rate may be reduced for a UE without substantially impairing base station decisions as to resource allocation and MCS. For instance, the one or more conditions may be based on a comparison of a threshold and a metric indicative of how often channel quality of a given UE may be expected to change. In one example, the metric may relate to a channel coherence, which indicates a rate of variation of a UE's channel quality based on one or more CSI reports received from the UE. In another example, the metric may relate to a UE mobility determined based on location information stored for the UE over a period of time.

In implementations that select the subset of UE(s) based on such condition(s), the systems and methods may further provide for (i) determining, for each UE served by the base station, a metric indicative of how often channel quality of the UE may be expected to change (e.g., a measure of channel coherence and/or UE mobility), (ii) comparing each determined metric to a selection-threshold value, and (iii) selecting, based on the comparison, the subset as the UE(s) having a metric that is less than the selection-threshold value. The system and method may thus reduce the CSI reporting rate for those UEs that are expected to experience changes in channel quality less frequently than other UEs. This may be beneficial because UEs that experience changes in channel quality less frequently than other UEs may report CSI less frequently than those other UEs, with less risk that the base station will have inaccurate or outdated information of the channel quality for the UEs.

In one respect, disclosed is a method operable by a communication system to reduce or avoid uplink congestion. In accordance with the method, a base station serves a plurality of UEs via an air interface extending between the base station and the UEs. The base station also receives, on an uplink of the air interface, a report from each UE indicating CSI. More particularly, the base station periodically receives the report from each UE according to a CSI reporting rate specified by the base station for the UE. While serving the UEs, the base station may determine that a level of loading on the uplink is greater than a threshold load value. Responsive to such determination, the base station selects a subset of the plurality of UEs and reduces the CSI reporting rate for the selected subset of the plurality of UEs to reduce congestion on the uplink.

In another respect, disclosed is a base station that includes an antenna structure for communicating over an air interface with a plurality of UEs, and a controller configured to manage communication via the antenna structure over the air interface. The controller is configured to (i) serve the plurality of UEs via the air interface, (ii) periodically receive, according to a CSI reporting rate specified by the base station, a report from each UE indicating CSI, (iii) determine that a level of loading on the uplink is greater than a threshold load value, (iv) responsive to the determination that the level of loading on the uplink is greater than the threshold load value, select a subset of the plurality of UEs, and (v) responsive to the selection of the subset, reduce the CSI reporting rate for the selected subset of the plurality of UEs to reduce congestion on the uplink. The reports indicating CSI may be received on an uplink of the air interface.

Still further, in another respect, disclosed is a method operable by a communication system to reduce or avoid uplink congestion. In accordance with the method, a base station serves a plurality of UEs with carrier aggregation on a plurality of component carriers through an air interface between the base station and the plurality of UEs. For each component carrier of each UE, the base station periodically receives a report indicating CSI for the component carrier of the UE. The base station periodically receives the report for each component carrier of each UE according to a CSI reporting rate specified by the base station for the component carrier of the UE. Also, the base station receives the reports on an uplink of the air interface. While serving the plurality of UEs, the base station may determine that a level of loading on the uplink is greater than a threshold load value. Responsive to such determination, the base station selects a subset including one or more component carriers of one or more UEs and reduces the CSI reporting rate for the selected subset.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
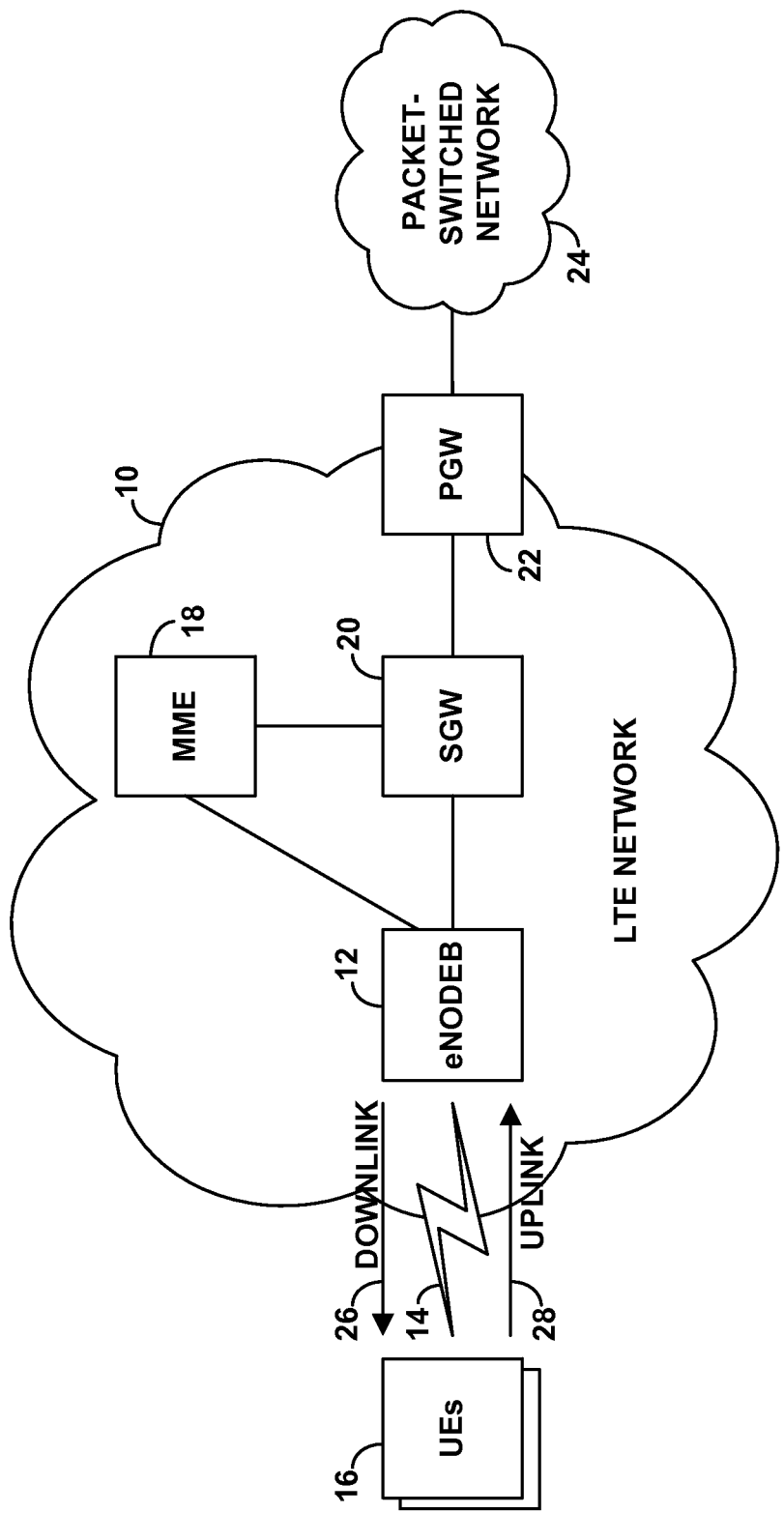
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs 16 with wireless packet data communication service, including possibly voice-over-packet service, but may also provide other functions. As shown, the LTE network 10 includes a base station (eNodeB) 12, which has an antenna structure and associated equipment for providing an LTE coverage area 14 in which to serve the UEs 16. The eNodeB 12 then has a communication interface with a mobility management entity (MME) 18 that functions as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In practice, the illustrated components of the LTE network 10 may sit as nodes on a private packet-switched network owned by an operator of the LTE network 10, and thus the various communication interfaces may be logical interfaces through that network.

As illustrated, the air interface of coverage area 14 defines a downlink direction 26 from the eNodeB 12 to the UEs 16 and an uplink direction 28 from the UEs 16 to the eNodeB 12. Further, the eNodeB 12 and the UEs 16 may be configured (e.g., licensed and programmed) to support air interface communication on various particular carriers, which may be FDD or TDD. Each such carrier and/or its particular downlink and uplink channels may be identified by one or more globally unique identifiers per industry standard, so that the eNodeB 12 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 12 to UEs 16, a physical downlink shared channel (PDSCH) for carrying scheduled downlink data communication, and a reference channel for carrying a reference signal that UEs 16 can monitor to evaluate coverage quality. Likewise, each carrier's uplink channel may define various sub-channels, such as a physical uplink control channel (PUCCH) for carrying scheduling requests, periodic CSI reports, and other control signaling from the UEs 16 to the eNodeB 12 and a physical uplink shared channel (PUSCH) for carrying scheduled uplink data communication.

With this arrangement, when a UE enters into coverage of the eNodeB 12, the UE may detect the eNodeB's 12 coverage on a particular carrier, and the UE may engage in an attach process or handover process to register with the LTE network 10 on that carrier. For instance, the UE may initially transmit to the eNodeB 12 an attach request, which the eNodeB 12 may pass along to the MME 18, triggering a process of authenticating the UE and establishment of one or more logical bearer connections for the UE between the eNodeB 12 and the PGW 22.

Further, the UE 16 may engage in signaling with the eNodeB 12 to establish a radio-link-layer connection (i.e., air interface connection) on the detected carrier, so that the eNodeB 12 may then serve the UE on that carrier. For instance, the UE and the eNodeB 12 may exchange radio resource control RRC configuration messaging to prepare the eNodeB 12 to serve the UE on the carrier and to prepare the UE to be served on the carrier. In this process, the eNodeB 12 may store a context record for the UE, indicating that the eNodeB 12 is serving the UE on the particular carrier, so that the eNodeB 12 may then serve the UE on the indicated carrier (e.g., then exchanging control signaling and bearer traffic with the UE on that carrier) per that context record. Further, the UE may store a context record indicating that the UE is being served on that carrier, so that the UE can then be served on that carrier (e.g., then exchanging control signaling and bearer traffic with the eNodeB 12 on that carrier) per that context record. As such, the radio-link-layer connection could be considered to effectively encompass initially just that one carrier.

In addition, during this initial attach process and/or more likely later while serving the UE, the eNodeB 12 and the UE may engage in RRC configuration messaging and/or other processing to modify or otherwise set the UE's radio-link-layer connection to encompass a different number of carriers. In particular, the eNodeB 12 and the UE may arrange the UE's radio-link-layer connection to encompass two or more carriers so as to facilitate carrier aggregation service.

To set or adjust the carriers encompassed by the UE's radio-link-layer connection, the eNodeB 12 may transmit to the UE a RRC connection reconfiguration message that specifies the carriers on which the eNodeB 12 will be serving the UE, identifying each carrier by its global identifier for instance. Further, to facilitate carrier aggregation service, the eNodeB 12 may designate one such carrier as a primary carrier or primary cell (PCell) by a special PCell index and the eNodeB 12 may designate each other carrier as a secondary carrier or secondary cell (SCell) by a special SCell index. The eNodeB 12 may then also update its context record for the UE to indicate that the UE's radio-link-layer connection now encompasses the indicated carriers, so that the eNodeB 12 may then engage in communication with the UE on those carriers. And the UE may responsively update its context record to indicate that the UE's radio-link-layer connection now encompasses the indicated carriers, so that the UE will be prepared to engage in communication with the eNodeB 12 on those carriers.

This or another process can be used to add or remove one or more carriers from a UE's radio-link-layer connection. For example, if the connection currently encompasses just one carrier, the process can be used to change the connection to encompass a different carrier and/or to add one or more additional carriers (e.g., as SCells) so as to facilitate carrier aggregation service. As another example, if the connection currently encompasses two or more carriers, the process can be used to add one or more additional carriers to the connection so as to provide increased carrier aggregation, or to remove one or more carriers from the connection so as to provide reduced carrier aggregation or to switch to single-carrier service. Other examples are possible as well.

In line with the discussion above, each of the UEs 16 may periodically determine its channel quality based on downlink transmissions (e.g., downlink reference signal strength) and perhaps one or more other factors (e.g., UE's capabilities), and the UE may periodically transmit to the eNodeB 12 (on the PUCCH) a CSI report including a CQI that indicates the UE's determined channel quality, a pre-coding matrix indicator (PMI), and/or a rank indicator (RI). If a UE's connection encompasses multiple carriers (i.e., as in a carrier aggregation scenario), the UE may do this on a carrier-by-carrier basis. That is, the UE may measure downlink channel quality of each carrier on a per carrier basis, determine CSI for each carrier on a per carrier basis, and separately report the determined CSI for each carrier on a per carrier basis. Using a standard CQI-MCS mapping table that maps CQI to MCS, the eNodeB 12 may then determine from the CQI reported for a given carrier which MCS to use for communication with the UE on that carrier, and the eNodeB 12 may allocate air interface resources accordingly.

Further, in line with the discussion above, the UEs 16 each periodically transmit the CSI report(s) to the eNodeB 12 on the PUCCH according to a CSI reporting rate specified by the eNodeB 12. The eNodeB 12 may specify the CSI reporting rate in one or more operational parameters provided to its served UEs 16 to facilitate operation of such UEs 16 in its coverage area. For example, the eNodeB 12 may specify a CSI reporting rate via operational parameters CQI-PMI-ConfigIndex and/or RI-ConfigIndex, which determine how often a UE reports CQI and PMI on the PUCCH and how often the UE reports RI on the PUCCH, respectively.

In some aspects, the eNodeB 12 may provide operational parameters to UEs 16 in a broadcast message, such as a system parameter message or system information block (e.g., a LTE System Block #8 (SIB8) information) that the eNodeB 12 broadcasts generally for UEs 16 to receive. In additional or alternative aspects, the eNodeB 12 may provide operational parameters to UEs 16 in control messages transmitted specifically to the individual UEs, such as in RRC messages for instance. The UEs 16 in the network may thus be configured to monitor for communications from the eNodeB 12 to read broadcast and/or control messages so as to receive and then operate in accordance with the specified operational parameters, including the specified CSI reporting rate.

As noted above, the present disclosure provides for managing signaling in a wireless communication network to help reduce or avoid congestion of an uplink air interface. In particular, the disclosure provides for reducing and/or avoiding uplink congestion by dynamically reducing the CSI reporting rate for one or more UEs served by a base station based on (i) a determination that a level of loading on the uplink is threshold heavy and (ii) a metric indicative of how often channel quality of the UEs may be expected to change. This process can be carried out by the eNodeB 12 itself and/or by one or more other network entities, such as with portions of the analysis carried out by an entity outside of the eNodeB 12 and the eNodeB 12 then responsively reducing the CSI reporting rate according to the analysis. For simplicity, however, the process will be described here in a scenario where the eNodeB 12 carries out all aspects of the process.

In line with the discussion above, the present disclosure can address a scenario where an eNodeB 12 is serving UEs 16 and where the eNodeB 12 detects that a level of loading on the uplink exceeds a threshold load value. As discussed above, when the eNodeB 12 detects that the level of loading on the uplink exceeds the threshold load value, the eNodeB 12 determines a metric for each of the served UEs, compares each determined metric to a selection-threshold, selects a subset of UEs based on the comparisons, and then instructs the selected subset of UEs to reduce their CSI reporting rate. Through this process, the eNodeB may reduce or avoid congestion on the uplink. The eNodeB may perform this process in a single-carrier service scenario and/or a carrier aggregation service scenario.

An example implementation of this process may begin in a scenario where the eNodeB 12 is serving multiple UEs 16 on a carrier. The eNodeB 12 may thus have an established radio-link-layer connection with each of the UEs 16 that includes an uplink for transmitting communications from the UEs 16 to the eNodeB 12 and a downlink for transmitting communications from the eNodeB 12 to the UEs 16. In this arrangement, the UEs 16 may each determine CSI based, at least in part, on downlink transmissions and the UEs 16 may periodically report the CSI to the eNodeB 12 according to a CSI reporting rate initially specified by the eNodeB 12.

While serving the UEs 16 in this manner, the eNodeB 12 may determine that the uplink is threshold heavily loaded. To facilitate this in practice, the eNodeB may determine a level of loading on the uplink of the carrier, and the eNodeB 12 may compare the determined level of loading to a threshold load value. In particular, the eNodeB 12 may determine that the uplink is threshold heavily loaded by determining that the level of load is greater than the threshold load value. According to some aspects, the threshold load value may be a configurable threshold set by the network operator.

In some examples, the level of loading can be measured as a tonnage of data transmitted over the uplink, the number of UEs transmitting data over the uplink, or a combination of the tonnage of data transmitted and the number of UEs transmitting data. In additional or alternative examples, the determined level of loading can include an indication as to an amount of data that is scheduled to be transmitted between the UEs 16 and the eNodeB 12 on the uplink. For instance, the eNodeB 12 may receive buffer status reports from the UEs 16. The buffer status reports may include a buffered-data value indicative of an amount of data of the wireless communication being buffered by the UEs 16 for transmission to the eNodeB 12.

In additional or alternative examples, the eNodeB 12 may determine the level of loading by comparing the number of resource blocks scheduled on the uplink relative to the maximum number of resource blocks that can be scheduled on the uplink for a given period of time. For instance, the level of loading may be determined as a percentage of the maximum uplink load possible, such as 70%, 85%, or 90%.

Responsive to the eNodeB 12 determining that the uplink is threshold heavily loaded, the eNodeB 12 may select a subset of one or more UEs and then reduce the CSI reporting rate for the subset of UE(s). In some examples, the subset of UE(s) may include all UEs served by the eNodeB. In other examples, the subset of UEs may include at least one but not all UEs served by the eNodeB. That is, the subset may be a proper subset of the UEs served by the base station.

As noted above, the eNodeB 12 may select the subset of UE(s) based on one or more conditions that may inform whether and to what extent the CSI reporting rate may be reduced for the subset of UE(s) without substantially impairing base station decisions as to resource allocation and MCS. For instance, the one or more conditions may be based on a comparison between a selection-threshold value and a metric that is indicative of how often channel quality may be expected to change for a given UE.

In some aspects, the metric may relate to a channel coherence, which indicates a rate of variation of a UE's channel quality. The eNodeB 12 can determine the channel coherence of a given UE, for example, from CSI reports previously provided by the UE to the eNodeB 12. As noted above, the CSI reports include information (e.g., CQI) that can be utilized by the eNodeB 12 to determine a metric indicative of how frequently the channel quality have changed for the UE over a given period of time. In practice, the eNodeB 12 can determine variations in CQI from the UE's prior CSI reports and then determine a rate of variation of the UE's channel quality based on the determined variations in CQI. Accordingly, the eNodeB 12 may be configured to process CSI reports and store relevant information in a memory for each UE it serves, on a per UE basis, to facilitate determinations of UE channel coherence.

In additional or alternative aspects, the metric may relate to UE mobility. In general, a UE having a relatively low mobility may be expected to experience less frequent changes in channel quality than a UE having a relatively high mobility. The eNodeB 12 may determine the mobility of each UE based on location information stored in memory for the UE over a period of time. In some implementations, the UE may determine its location information, for example, based on a global positioning system (GPS), and periodically transmit the location information to the eNodeB 12 over the uplink. Upon receiving the location information from the UE, the eNodeB 12 may store the location information in memory. In additional or alternative implementations, the eNodeB 12 may determine the location information for a UE, for example, by triangulation between the eNodeB 12 and other eNodeBs in the network, and then store the location information in memory. In general, the eNodeB 12 may determine the mobility of each UE, on a per UE basis, by processing location information stored in memory for the UE and determining a rate of change of the location of the UE over a period of time.

Once the eNodeB 12 determines the metric for each UE 16, the eNodeB 12 may compare the determined metrics of each UE to the selection-threshold value. In particular, for example, the eNodeB 12 may compare each metric to the selection-threshold value to determine which UEs have a metric that is less than the selection-threshold value. Based on this comparison, the eNodeB 12 may select the UE(s) determined to have a metric that is less than the selection-threshold value as the subset of UE(s). In this way, the eNodeB 12 may select UE(s) that are expected to experience changes in channel quality less frequently than other UEs. This may be beneficial because UEs that experience changes in quality less frequently than other UEs may report CSI less frequently than those other UEs, with less risk that the eNodeB will have inaccurate or outdated information of the channel quality for the UEs.

To reduce the CSI reporting rate for the selected subset of UE(s), the eNodeB 12 may transmit RRC connection reconfiguration messages to the subset of UE(s) specifying a reduced CSI reporting rate. For example, the eNodeB 12 may specify the reduced CSI reporting rate by providing values for operational parameters CQI-PMI-ConfigIndex and/or RI-ConfigIndex in the RRC messages. The subset of UE(s) may monitor for such RRC messages from the eNodeB 12 so as to receive and then operate in accordance with the reduced CSI reporting rate.

According to some aspects, the CSI reporting rate may be iteratively reduced for the subset of UE(s) until the eNodeB determines that level of loading on the uplink is less than the threshold load value. Accordingly, after the CSI reporting rate is initially reduced for the subset of UE(s), the eNodeB 12 may again evaluate the loading on the uplink to determine whether the uplink remains threshold heavily loaded. To do so, the eNodeB 12 may again determine the level of loading on the uplink and compare the determined level of loading to the threshold load value. If the eNodeB 12 determines that the level of loading on the uplink is less than the threshold load value, the process may end. On the other hand, if the eNodeB 12 determines that the level of loading on the uplink remains greater than the threshold load value, the eNodeB 12 may further reduce the CSI reporting rate for the subset of UE(s). The eNodeB 12 may continue to iteratively evaluate the level of loading on the uplink and reduce the CSI reporting rate for the subset of UE(s) until the eNodeB 12 determines that the level of loading on the uplink is less than the threshold load level.

In some examples, the eNodeB 12 may reduce CSI reporting rate by a fixed amount from one iteration to the next. In other examples, the eNodeB 12 may reduce CSI reporting rate by a variable amount from one iteration to the next.

In some aspects, the eNodeB 12 may specify CSI reporting rates in terms of a regular interval between consecutive CSI reports (a "CSI reporting interval"). For example, in an LTE system, the eNodeB 12 may specify a CSI reporting interval between 2 ms and 160 ms in order to specify a corresponding CSI reporting rate between one CSI report per 2 ms and one CSI report per 160 ms. In one implementation, the eNodeB 12 may reduce the CSI reporting rate over multiple iterations by specifying CSI reporting intervals that differ from each other by an integer factor. For example, the eNodeB 12 may employ the following equation to determine the CSI reporting interval:

$$\text{CSI Reporting Interval} = n*T \qquad (\text{Eq. 1})$$

where T is a constant variable corresponding to an initial CSI reporting interval value and n is an integer value corresponding to the number of iterations that have been performed (e.g., 1, 2, 3, 4, etc.). Accordingly, the eNodeB 12 may first reduce the CSI reporting rate for the subset of UE(s) by specifying a CSI reporting interval of 1*T and then, if the uplink remains threshold heavily load, the eNodeB 12 may further reduce the CSI reporting rate by specifying a CSI reporting interval of 2*T, and so on.

The process described above may be employed in a single-carrier service scenario and/or a carrier aggregation service scenario. In accordance with the LTE protocol, UEs 16 report periodic CSI over the PUCCH; however, when carrier aggregation is employed, only the PCell has a PUCCH (i.e., the SCells do not have PUCCH according to LTE protocol). As such, when served with carrier aggregation, the UE may separately report CSI for the SCell(s) and CSI for the PCell over the uplink of the PCell.

According to some aspects, in a carrier aggregation scenario, the eNodeB 12 may monitor the level of loading on the PCell uplink and, responsive to the eNodeB 12 determining that the level of loading on the PCell uplink is greater than the threshold load level, the eNodeB 12 may select a subset of UE(s) and reduce the CSI reporting rate for all component carriers of the subset as described above.

According to alternative aspects, the eNodeB 12 may decide whether to reduce CSI reporting rate on a component-carrier-by-component-carrier basis for each UE. According to LTE protocol, the eNodeB 12 can independently configure the PCell and each SCell for CSI reporting. That is, the eNodeB 12 may specify, for a UE served with carrier aggregation, the same CSI reporting rate for all component carriers or, alternatively, the eNodeB 12 may specify a CSI reporting rate for one component carrier that differs from the CSI reporting rate specified for at least one other component carrier.

As such, according to these alternative aspects, the eNodeB 12 may select the subset on a component-carrier-by-component-carrier basis for the UEs 16. For example, the eNodeB 12 may be configured to determine a metric for each component carrier of each UE and then independently compare the determined metrics to the selection-threshold value to determine which component carriers of which UEs to select as the subset. In one example implementation, the eNodeB 12 may determine, for each component carrier of each UE, a respective channel coherence based on CSI reports received for that component carrier of that UE. The eNodeB 12 may further compare each determine channel coherence to the selection-threshold value and select the subset based on the comparisons. Upon selecting the subset, the eNodeB 12 may then send RRC connection reconfiguration messages to the UEs of the subset indicating the reduced CSI reporting rate for the specific component carriers of the subset. In this way, the eNodeB 12 may reduce the CSI reporting rate for select UEs on a component-carrier-by-component-carrier basis.

Figure 2:
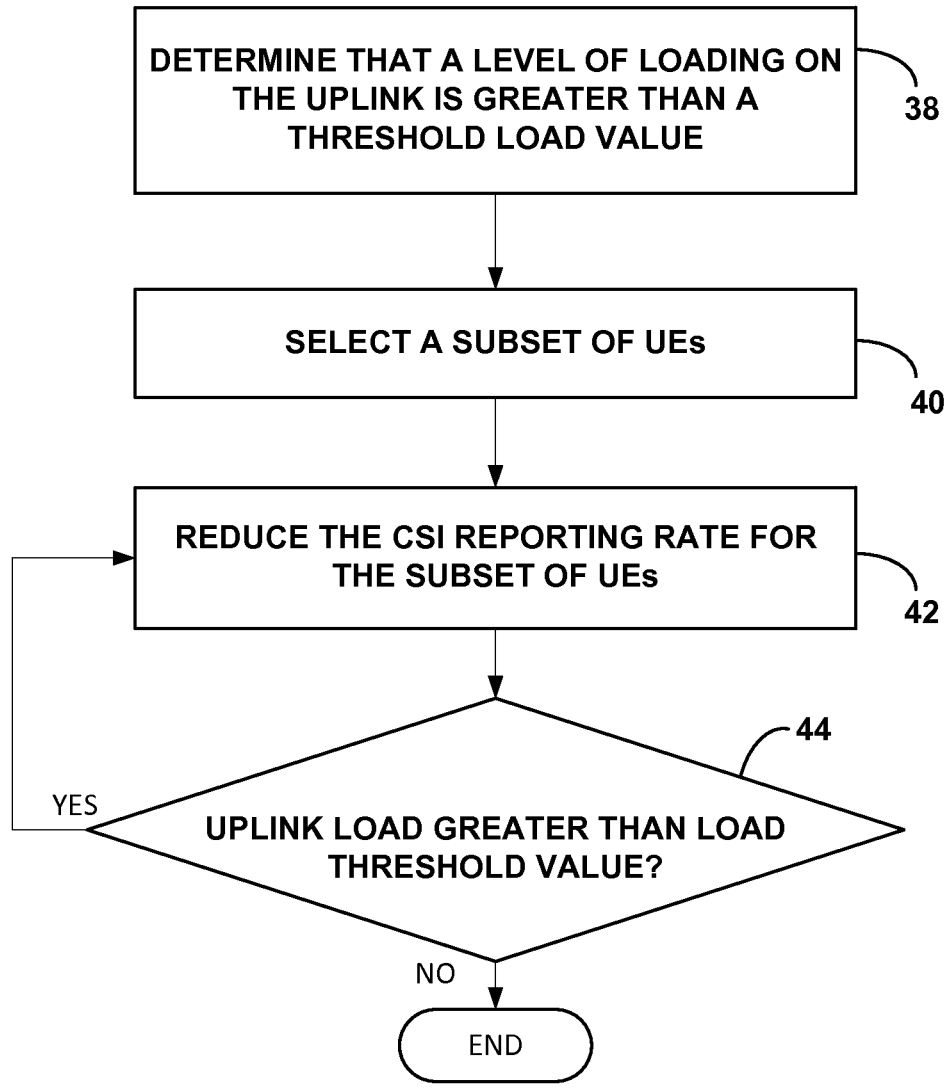
FIG. 2 is a flow chart depicting example operations in accordance with the disclosure.

FIG. 2 is next a flow chart depicting an example set of operations that can be carried out in an implementation of the process according to some aspects of the disclosure. In the illustrated example, the process relates to a scenario in which a base station (e.g., the eNodeB 12) serves UEs via an air interface connection extending between the base station and the UEs. The base station may be serving UEs on just one carrier, or with carrier aggregation on multiple carriers. Further, in this scenario, the base station periodically receives, on an uplink of the air interface (i.e., on a PUCCH), a report from each UE indicating CSI determined by the UE. Each UE may transmit and the base station may receive the CSI reports according to a CSI reporting rate specified by the base station.

As shown in FIG. 2, at block 38, the method begins with the base station determining that a level of loading on the uplink is greater than a threshold load value. At block 40, responsive to the base station determining that the level of loading on the uplink is greater than the threshold load value, the base station selects a subset of UEs. In some examples, the subset of UEs may include all UEs served by the base station. In other examples, the subset of UEs may include at least one but not all UEs served by the base station (i.e., the subset may be a proper subset of the UEs served by the base station). As described above, the subset of UEs may be selected based on a metric that is indicative of how often channel quality of a given UE may be expected to change (e.g., a metric relating to channel coherence and/or UE mobility). For example, the base station may select as the subset UEs determined to have a metric that is less than a selection-threshold value.

At block 42, the method involves the base station reducing the CSI reporting rate for the subset of UEs selected at block 40. The base station may do so via RRC signaling. At block 44, the base station determines whether the level of loading on the uplink is greater than the threshold load value. If the base station determines that the level of loading is greater than the threshold load value at block 44, then the method may return to block 42 to further reduce the CSI reporting rate for the subset of UEs. The base station may continue to iteratively determine whether the level of loading is greater than the threshold load value at block 44 and reduce the CSI reporting rate for the subset of UEs at block 42 until the base station determines that the level of loading is not greater than the threshold load value at block 44. Once the base station determines that the level of loading is not greater than the threshold load value at block 44, the method may end.

Figure 3:
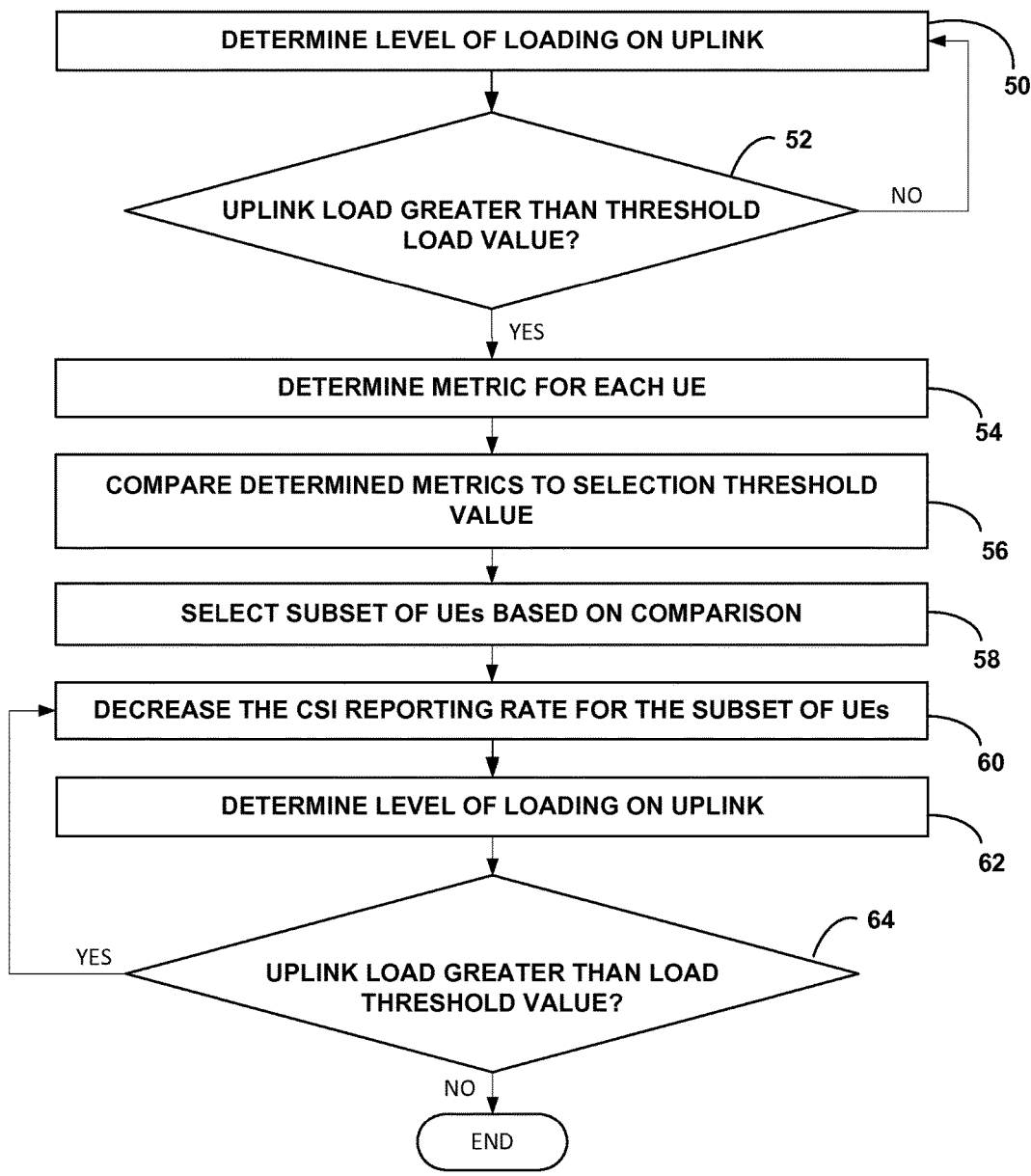
FIG. 3 is another flow chart depicting example operations in accordance with the disclosure.

FIG. 3 is next a flow chart depicting another example set of operations that can be carried out by a base station such as eNodeB 12 in an implementation of this process. In the illustrated example, the process relates to a scenario in which a base station serves UEs via an air interface connection extending between the base station and the UEs. The eNodeB may be serving UEs on just one carrier, or with carrier aggregation on multiple carriers. Further, in this scenario, the base station periodically receives, on an uplink of the air interface, a report from each UE indicating CSI determined by the UE. Each UE may transmit and the base station may receive CSI reports according to a CSI reporting rate specified by the base station.

As shown in FIG. 3, at block 50, the method begins with the base station determining a level of loading on the uplink. At block 52, the method involves the base station determining whether the level of loading determined at block 50 is greater than a threshold load value. If the base station determines, at block 52, that the level of loading on the uplink is not greater than the threshold load value, the method returns to block 50. The base station may continue to monitor the level of loading on the uplink at blocks 50 and 52 until the base station determines that the level of loading on the uplink is greater than the threshold load value at block 52.

If the base station determines that the level of loading on the uplink is greater than the threshold load value at block 52, the base station determines a respective metric for each UE at block 54. As described above, the metric may provide an indication as to how often channel quality for a given UE may be expected to change. For example, the metric may relate to a channel coherence and/or mobility of the UE. The base station may determine the channel coherence for a UE based on CSI reports previously received for the UE. The base station may additionally or alternatively determine UE mobility based on location information stored in memory. The base station may receive the location information from the UE or the base station may determine the location information as described above.

At block 56, the method involves the base station comparing each metric determined at block 54 to a selection-threshold value. Based on the comparison at block 56, the base station selects a subset of UEs at block 58. In particular, the base station may select the subset at block 58 by selecting the UEs having one or more metrics determined to be less than the selection-threshold value based on the comparison at block 56.

At block 60, the method involves the base station reducing the CSI reporting rate for the subset of UEs responsive to the selection of the subset of UEs at block 58. The base station may do so via RRC signaling. At block 62, the base station again determines the level of loading on the uplink. At block 64, the base station determines whether the level of loading on the uplink determined at block 62 is greater than the threshold load value. If the base station determines that the level of loading is greater than the threshold load value at block 64, then the method may return to block 60 to further reduce the CSI reporting rate for the subset of UEs. The base station may iteratively determine the level of loading on the uplink at block 62, determine whether the level of load is greater than the threshold load value at block 64, and reduce the CSI reporting rate for the subset of UEs at block 60 until the base station determines that the level of loading is not greater than the threshold load value at block 64. Once the base station determines that the level of loading is not greater than the threshold load value at block 64, the method may end.

Figure 4:
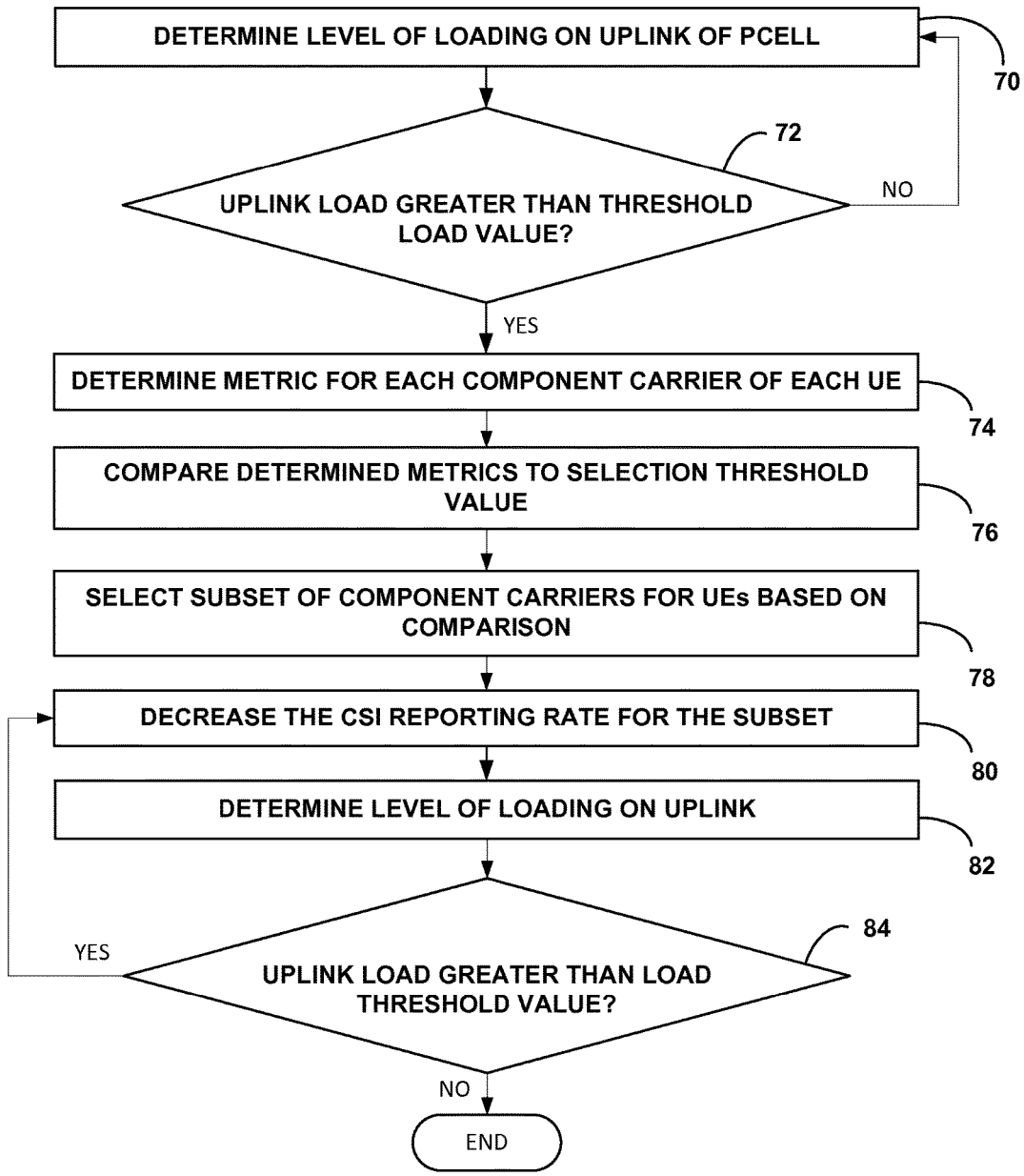
FIG. 4 is another flow chart depicting example operations in accordance with the disclosure.

FIG. 4 is next a flow chart depicting another example set of operations that can be carried out by a base station such as eNodeB 12 in an implementation of this process. In the illustrated example, the process relates to a scenario in which a base station serving UEs with carrier aggregation on a plurality of component carriers through an air interface connection between the base station and the UEs. By engaging in carrier aggregation, the base station may allocate PDSCH and/or PUSCH resources on the component carriers concurrently (e.g., distributing the data transmission among resources on the component carriers) and may transmit to the UEs on a PDCCH of the PCell and perhaps also on a PDCCH of one or more SCells one or more DCI messages that specify the allocation. The base station and the UE may then communicate the data on the allocated resources. The base station may further allocate resources on the PUCCH of the PCell for carrying scheduling requests, periodic CSI reports and other control signaling from the UEs to the base station.

Further, in this scenario, for each component carrier of each UE, the base station periodically receives on an uplink of the air interface (i.e., the PUCCH of the PCell) a report indicating CSI determined by the UE for the component carrier. Each UE may transmit and the base station may receive CSI reports according to a CSI reporting rate specified by the base station.

As shown in FIG. 4, at block 70, the method begins with the base station determining a level of loading on the uplink of the PCell. At block 72, the method involves the base station determining whether the level of loading determined at block 70 is greater than a threshold load value. If the base station determines, at block 72, that the level of loading on the uplink is not greater than the threshold load value, the method returns to block 70. The base station may continue to monitor the level of loading on the uplink at blocks 70 and 72 until the base station determines that the level of loading on the uplink is greater than the threshold load value at block 72.

If the base station determines that the level of loading on the uplink is greater than the threshold load value at block 72, the base station determines a respective metric for each component carrier of each UE at block 74. For example, the base station may determine, on a component-carrier-by-component-carrier basis, a channel coherence for each component carrier of each UE based on CSI reports previously received from the UE for that component carrier.

At block 76, the method involves the base station comparing each metric determined at block 74 to a selection-threshold value. Based on the comparison at block 76, the base station selects a subset of component carriers for UEs at block 78. In particular, the base station may select the subset at block 78 by selecting the component carriers of UEs each having a metric determined to be less than the selection-threshold value at block 76.

At block 80, the method involves the base station reducing the CSI reporting rate for the subset selected at block 78. The base station may do so via RRC signaling as described above. At block 82, the base station again determines the level of loading on the uplink. At block 84, the base station determines whether the level of loading on the uplink determined at block 82 is greater than the threshold load value. If the base station determines that the level of loading is greater than the threshold load value at block 84, then the method may return to block 80 to further reduce the CSI reporting rate for the subset of UEs. The base station may iteratively determine the level of loading on the uplink at block 82, determine whether the level of load is greater than the threshold load value at block 84, and reduce the CSI reporting rate for the subset at block 80 until the base station determines that the level of loading is not greater than the threshold load value at block 84. Once the base station determines that the level of loading is not greater than the threshold load value at block 84, the method may end.

Figure 5:
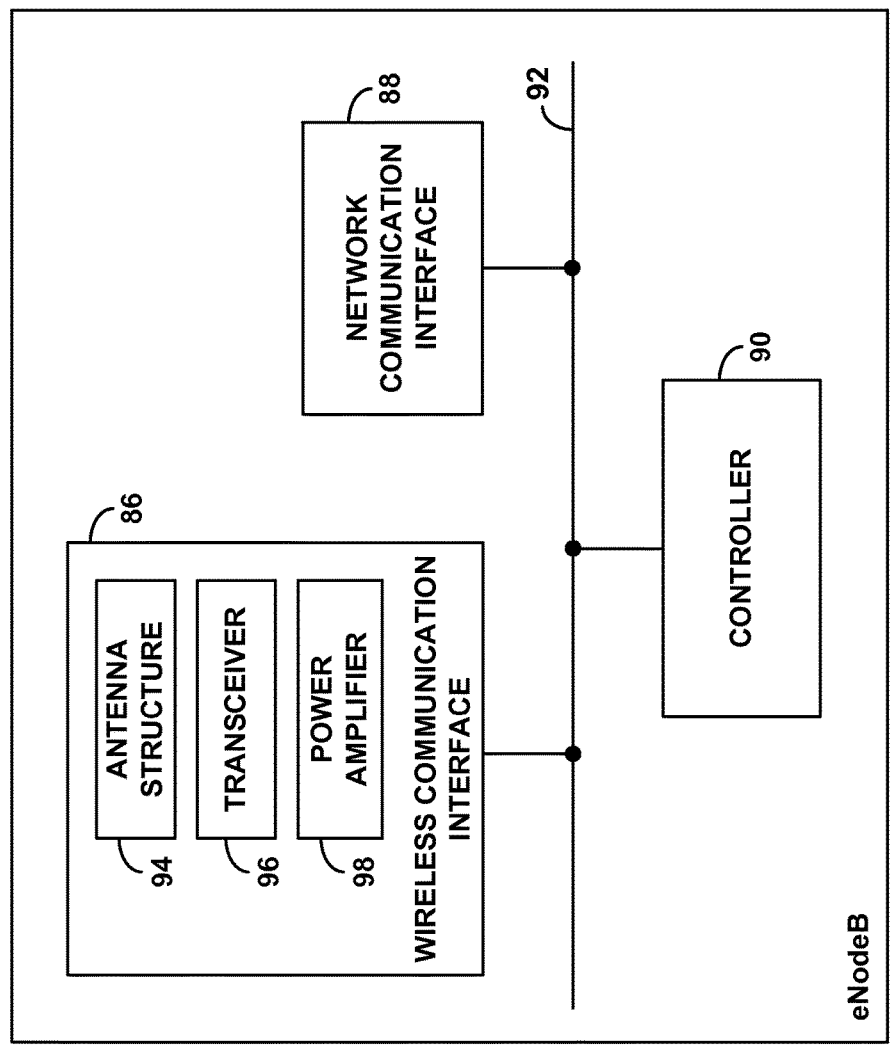
FIG. 5 is a simplified block diagram of an example base station operable in accordance with the disclosure.

FIG. 5 is a simplified block diagram of an example eNodeB (e.g., macro eNodeB, small cell, or other type of base station), showing some of the components that such a device may include in order to carry out these and other operations. As shown, the example eNodeB includes a wireless communication interface 86, a network communication interface 88, and a controller 90, all of which can be integrated together in various ways or, as shown, interconnected with each other through a system bus, network, or other connection mechanism 92.

Wireless communication interface 86 includes an antenna structure (e.g., one or more antennas or antenna elements) 94, which can be tower mounted or provided in some other manner, configured to transmit and receive over the air interface and thereby facilitate communication with served UEs. Further, the wireless communication interface includes a transceiver 96 and power amplifier 98 supporting air interface communication according to the LTE protocol. Network communication interface 88 may then comprise one or more wired and/or wireless network interfaces (such as an Ethernet interface) through which the base station may transmit and receive data over a backhaul connection with SGW 20 as discussed above.

Controller 90, which may be integrated with wireless communication interface 86 or with one or more other components of the eNodeB, may then be configured to manage communication over the air interface, including managing signaling to reduce or avoid congestion on a PUCCH uplink. By way of example, controller 90 may be configured to (i) determine a level of load on an uplink, (ii) determine that the level of load on the uplink is greater than a threshold load value, (iii) determine a metric for UEs, (iv) compare the determined metrics to a selection-threshold value, (v) select a subset of UEs based on the comparison, and (vi) reduce the CSI reporting rate for the subset of UEs.

Controller 90 can be implemented using hardware, software, and/or firmware. For example, controller 90 can include one or more processors and a non-transitory computer readable medium (e.g., volatile and/or non-volatile memory) that stores machine language instructions or other executable instructions. The instructions, when executed by the one or more processors, may cause controller 90, and thus the eNodeB, to carry out the various base station operations described herein.

FIGS. 2-4, described by way of example above, represent algorithms that correspond to at least some instructions executed by the controller 90 in FIG. 5 to perform the above described functions associated with the described concepts. It is also within the scope and spirit of the present concepts to omit steps, include additional steps, and/or modify the order of steps presented above.

Exemplary embodiments have been described above. Those skilled in the art will understand, however, that changes and modifications may be made to these embodiments without departing from the true scope and spirit of the invention.

What is claimed is:

1. A method for managing signaling in a wireless communication system, the method comprising:
   serving, by a base station, a plurality of user equipment devices (UEs) via an air interface extending between the base station and the plurality of UEs;
   receiving, on an uplink of the air interface, a report from each UE indicating channel state information (CSI), wherein the report indicating CSI is periodically received from each UE according to a CSI reporting rate specified by the base station for the UE;

while serving the plurality of UEs, determining that a level of loading on the uplink is greater than a threshold load value; and responsive to the determining that the level of loading on the uplink is greater than the threshold load value: (i) selecting a subset of the plurality of UEs, and (ii) responsive to selecting the subset, reducing the CSI reporting rate for the selected subset of the plurality of UEs to reduce congestion on the uplink.

2. The method of claim 1, wherein selecting the subset of the plurality of UEs comprises:

for each of the plurality of UEs, determining a respective channel coherence;

comparing each of the determined channel coherences to a selection-threshold value to determine that one or more of the plurality of UEs have respective channel coherences that are less than the selection-threshold value; and selecting the one or more of the plurality of UEs, determined based on the comparison, as the subset of the plurality of UEs.

3. The method of claim 1, wherein selecting the subset of the plurality of UEs comprises:

for each of the plurality of UEs, determining a respective mobility metric indicative of a mobility of the UE;

comparing each of the determined mobility metrics to a selection-threshold value to determine that one or more of the plurality of UEs have respective mobility metrics that are less than the selection-threshold value; and selecting the one or more UEs, determined based on the comparison, as the subset of the plurality of UEs.

4. The method of claim 1, further comprising:

after reducing the CSI reporting rate a first time, determining that the level of loading on the uplink remains greater than the threshold load value; and responsive to determining that the level of loading on the uplink remains greater than the threshold load value after the first time, reducing the CSI reporting rate for the subset of the plurality of UEs a second time.

5. The method of claim 4, further comprising iteratively reducing the CSI reporting rate for the subset of the plurality of UEs until the level of loading on the uplink is less than the threshold load value.

6. The method of claim 5, wherein iteratively reducing the CSI reporting rate comprises increasing a CSI reporting interval by an integer factor, wherein the CSI reporting interval is a regular interval of time between consecutive reports.

7. The method of claim 1, wherein reducing the CSI reporting rate comprises transmitting, by the base station to each of the subset of the plurality of UEs, a RRC connection reconfiguration message including an operational parameter indicating a reduced CSI reporting rate.

8. The method of claim 1, wherein the CSI includes information selected from the group consisting of a channel quality indicator (CQI), a precoding matric indicator (PMI), and a rank indicator (RI).

9. The method of claim 1, wherein the subset of the plurality of UEs is a proper subset.

10. A method for managing signaling in a wireless communication system, the method comprising:

serving, by a base station, a plurality of user equipment devices (UEs) with carrier aggregation on a plurality of component carriers through an air interface between the base station and the plurality of UEs;

for each component carrier of each UE, periodically receiving a report indicating channel state information (CSI) for the component carrier of the UE, wherein the report is received for each component carrier of each UE according to a CSI reporting rate specified by the base station for the component carrier of the UE, wherein the reports are received on an uplink of the air interface;

while serving the plurality of UEs, determining that a level of loading on the uplink is greater than a threshold load value; and responsive to determining that the level of loading on the uplink is greater than the threshold load value: (i) selecting from the plurality of component carriers of the plurality of UEs a subset including one or more component carriers of one or more UEs, and (ii) responsive to selecting the subset, reducing the CSI reporting rate for the selected subset.

11. The method of claim 10, wherein periodically receiving the report comprises receiving the report for each component carrier of each UE on an uplink of only one of the plurality of component carriers.

12. The method of claim 10, wherein selecting the subset comprises:

for each component carrier of each UE, determining a respective channel coherence;

comparing each of the determined channel coherences to a selection-threshold value; and selecting, based on the comparison, the one or more component carriers of the one or more UEs as the subset.

13. The method of claim 10, wherein reducing the CSI reporting rate comprises transmitting, by the base station to each UE of the subset, a RRC connection reconfiguration message including an operational parameter indicating a reduced CSI reporting rate for a component carrier of the UE.

14. The method of claim 10, wherein the subset is a proper subset.

15. A base station comprising:

an antenna structure for communicating over an air interface with a plurality of user equipment devices (UEs); and a controller configured to manage communication via the antenna structure over the air interface, wherein the controller is configured to:

(i) serve the plurality of UEs via the air interface, (ii) receive, on an uplink of the air interface, a report from each UE indicating channel state information (CSI), wherein the report indicating CSI is periodically received for each UE according to a CSI reporting rate specified by the base station for the UE, (iii) determine that a level of loading on the uplink is greater than a threshold load value, and (iv) responsive to the determination that the level of loading on the uplink is greater than the threshold load value: (a) select a subset of the plurality of UEs, and (b) responsive to the selection of the subset, reduce the CSI reporting rate for the selected subset of the plurality of UEs to reduce congestion on the uplink.

16. The base station of claim 15, wherein the controller is further configured to:

after reducing the CSI reporting rate a first time, determine that the level of loading on the uplink remains greater than the threshold load value; and responsive to determining that the level of loading on the uplink remains greater than the threshold load value after the first time, reduce the CSI reporting rate for the subset of the plurality of UEs a second time.

17. The base station of claim 16, wherein the controller is further configured to iteratively reduce the CSI reporting rate for the subset of the plurality of UEs until the level of loading on the uplink is less than the threshold load value.

18. The base station of claim 15, wherein, to reduce the CSI reporting rate, the controller is further configured to transmit, to each UE of the subset, a RRC connection reconfiguration message including an operational parameter indicating a reduced CSI reporting rate.

19. The base station of claim 15, wherein the subset of the plurality of UEs is a proper subset.

20. The base station of claim 15, wherein the CSI includes information selected from the group consisting of a channel quality indicator (CQI), a precoding matric indicator (PMI), and a rank indicator (RI).

* * * * *